United States Patent [19]
Lee

[11] Patent Number: 5,870,762
[45] Date of Patent: Feb. 9, 1999

[54] ERROR DETECTION AND RECOVERY OF DATABASE FILES

[76] Inventor: Paul Lee, HC 62, Box 100K, Great Cacapon, W. Va. 25422

[21] Appl. No.: 721,010

[22] Filed: Sep. 26, 1996

[51] Int. Cl.$^6$ .................................................. G06F 17/30
[52] U.S. Cl. ............................ 707/202; 707/204; 707/10
[58] Field of Search .................................. 707/202, 204, 707/10

[56] References Cited

U.S. PATENT DOCUMENTS

| | | | |
|---|---|---|---|
| 5,280,611 | 1/1994 | Chandrasekaran et al. | 395/600 |
| 5,404,502 | 4/1995 | Warner et al. | 395/575 |
| 5,404,508 | 4/1995 | Konrad et al. | 395/600 |
| 5,561,793 | 10/1996 | Bennett et al. | 707/201 |

OTHER PUBLICATIONS http://w.w.w. symantec. com/nu/fs Symantec Norton Ultilities—File Fix (page 2) (1996).

http://www.usa.net/hall (web page reprint) Paul Heiser–d–Salvage (1996).

http://www.usa.net/hall/foxfix/default–html (web page reprint) Xitechnics–Fox (1996).

*Primary Examiner*—Thomas G. Black
*Assistant Examiner*—Donald Min

[57] ABSTRACT

An improved method for encoding, error detection and restoration of corrupted database files comprises generating a unique record code in each record of a record file, and when a memo file is present, generating a unique memo code in each memo of the memo file for identifying the correlation of the memo to one particular record field and one uniquely identified record. Error detection is achieved by verifying locations of record codes in record files; memo codes in memo files; and the correlation between memo codes in memo file and the record codes in record file. Integrity of record file is restored by searching for record codes and rewriting the located records in correct file structure positions. Memo file integrity is restored by searching for memo codes and rewriting memos in correct file structure positions, and memo pointers are corrected by using the method's correlation between record codes and memo codes to locate correct memos in the memo file.

16 Claims, 3 Drawing Sheets

ERROR DETECTION AND RECOVERY OF DATABASE FILES

BACKGROUND

1. Field of the Invention

This invention relates generally to methods for restoring data from damaged or corrupted computer files, specifically to a method for uniquely encoding database files, and using the encoding method to accomplish reliable error detection and restoration of the database files after they are corrupted.

2. Introduction

One of the primary uses for computers, whether for personal desktop computers or mainframe computers, concerns the processing of database information. A database is a collection of information arranged in an organized, easier-to-find manner. A typical database might include financial and accounting information, demographics and market survey data, bibliographic or archival data, personnel and organizational information, public governmental records, private business or customer data such as addresses and phone numbers, etc.

Database information is usually contained in computer files arranged in a pre-selected database format, and the data contents within them are maintained for convenient access on magnetic media, both for storage and for updating the file contents as needed.

A conventional computer database, of the dBase type, comprises a data record file having a plurality of fixed byte-length records; and an optional file, for storing larger variable byte-length data, commonly known as the memo file. Both types of files typically include a file header with file structure information, and a data region that contains the useful data. The record file header may contain file structural information such as byte-length of a record, position of the first record in a file, and number of records in a file. The memo file header typically contains the location of the next available memo position. Variation might exist, to include for example information within the header indicating other formatting details or other characteristics of the file contents. Corruption of header errors is not difficult to detect or repair. A more difficult task involves detecting errors and restoring the contents of data regions in either record or memo files, when such files become corrupted or damaged.

In a record file, the data region consists structurally of one or more equal length records positioned sequentially one after the other at fixed interval positions in the file structure. Each record is subdivided into one or more fields, with each field containing a single type of data such as binary, alphanumeric or other type of data. Each record has the same number of fields and same field types. One or more of the fields may also be memo fields storing memo pointers. Memo pointers are numerical values which indicate the positions of "memos", the variable byte-size data units in the memo file. Instead of individual byte-count memo size variations, sometimes memos are made up of larger sized entities called "memo blocks", each block of memo data having a suitably convenient predetermined byte size, e.g. 512 bytes. In older database memo files, such as Borland dBaseIII, memos were only constructed to store text information. However, newer memo files, such as Microsoft FoxPro memo files, can also store graphics, multimedia, or any other digital or binary-coded information. For purposes of this invention, no distinction is made between these different memo file data unit types, and they are simply referred to as memos.

A database file may be corrupted (damaged) for a number of reasons, including application program bugs, the crashing of the database application program, the crashing of the operating system, and the rebooting of the computer when the program is running, among other reasons. Corruption may occur in the header and/or the data region. Corruption in the data region may include offsets that separate adjacent valid records or memos by extraneous bytes; incorrect memo pointers that reference wrong memos; illegal memo pointers that reference non-existent memos; and cross-linked memo pointers that reference the same memo. Offsets disrupt the structural positions of records or memos, i.e., they cause the records or memos to be arranged at incorrect byte-count positions within their respective files.

The description of prior art and preferred embodiment focuses on dBase type databases having separate record and memo files. However, concepts discussed can be applied to database files having records, memos and other information combined in a single file, such as Microsoft Access and similar database files.

3. Description of Prior Art:

A variety of approaches have been suggested for users of computer database programs, as suitable means for ensuring data integrity and restoring corrupted database files. Such error detection and restoration methods found in the prior art can be classified into three categories.

The first category is a simple periodic backup, in which duplicates of the files are made on either the same storage device, such as a hard disk, or a separate storage device, such as a backup diskette, tape cassette or other removable media. Errors are detected in such a system only when the system fails or the errors are grossly apparent, while small cumulative errors in data may go undetected for extended periods of time. Furthermore, data entered or generated since the last backup cannot be recovered after database becomes corrupted. Also, many users fail to make periodic backups.

The second category provides automatic duplication of data or transaction loging on the same or another storage device. Examples of such and similar systems are disclosed in U.S. Pat. Nos. 5,280,611; 5,404,502; and 5,404,508. When data becomes corrupted the same or secondary device still has the uncorrupted data available. However, such real-time recovery systems are only adaptable to large system installations, requiring expensive hardware and software support often beyond the budget of individuals and small businesses.

The third category includes file repair utilities (FRU's) known to the prior art which can provide some amount of protection from file damage and corruption, but are nonetheless limited in many respects. A first type of FRU, such as "Norton Utilities FileFix" published by Symantec, has limited capability since it repairs only header damage. It cannot detect errors in the data region, and cannot effect necessary repairs to prevent file damage in the data region. Furthermore, it must be activated by a user, and requires the user to stop using the application program while the FRU is in operation. A second type of FRU, such as "dSalvage", distributed by Hallogram Publishing, can be used to repair both header and data region damage, but requires manual user intervention and considerable user skills in its operation and furthermore has limited error detection capability. A third type of FRU, such as "FoxFix", developed by XiTechnics Corporation, is substantially automatic, and requires no user interaction. It is fast and efficient, but it can detect and repair only very limited data region corruption problems. For example, it cannot reliably detect or repair offset record damage, nor resolve incorrect, illegal or cross-linked memo pointers.

Error detection methods incorporated in prior art FRU's have attempted to ensure file integrity of database files by one of three types of approaches, each of them having serious limitations: The first type of approach involves detection of record offset errors in the record file. There is no reliable way to scan through the record file and determine that each record is where it is supposed to be. An example method attempts to scan the first byte of each proper record position for the traditional delete flag which can contain either a space, '' character, or a '*' deleted flag character. Anything else indicates a record error. However, normal data in the rest of the record may contain '*' characters and spaces are frequent. Hence detecting those two characters in first byte is not an indication of correct record positions.

The second type of approach detects offset errors in the memo file. Both traditional dBase files and newer file variations lack unique characters to indicate the starting position of a memo in a memo file. One exception is FoxPro file memos, which use a 0001 (hex) and 0002 (hex) byte value sequence at the start of memos to distinguish text memos from graphical memo types. However, this is not a reliable means for locating memos, since 0 byte values are very common in memo files and can be followed by a random 1 or 2 byte value.

A third type is detection of memo pointer errors. The only two such errors that can be detected by prior art FRU's are illegal pointers, those which point beyond the end of the file, and, in some cases, invalid pointers, those which do not point to a memo start position or where plurality of pointers point to the same memo. The plurality of memo pointers pointing to same memo are sometimes referred to as cross-linked pointers. There is no prior art found in any FRU software providing a method to determine which of the cross-linked memo pointers is correct, nor a method how to correct the other memos. Furthermore, the available prior art cannot in fact determine that a pointer is correct. A pointer can be the only pointer to reference a valid memo position, yet it may reference an incorrect memo.

Reliable error detection is important not only in cases when data corruption become obvious to the program user, but also in cases when no errors are apparent. Business and government operations with accumulating undetected errors can have serious consequences.

OBJECTS OF THE INVENTION

Accordingly an object of the present invention is to provide an economical but significantly improved capability for consistent and reliable error detection and for similarly reliable data recovery including the detection and repair of: record file data region corruption such as record dislocations; illegal, incorrect and cross-linked memo pointers; and memo file data region corruption, such as memo dislocations.

Yet another object of the present invention is to provide a method for error detection and restoration of database files that is substantially automatic in its operation, so that virtually no end user interaction is required. Further objects of the present invention will become apparent from a consideration of the drawings and ensuing description.

SUMMARY OF THE INVENTION

A method of error detection and restoration of database files comprises generating a unique record code in each record of the record file, and when a memo file is present, generating a unique memo code in each memo of the memo file for identifying the correlation of the memo to one particular record field and one uniquely identified record. This correlation, along with the requirement that record codes and memo codes have specific locations, provides a basis for a computer programmed algorithm that can be used to accurately detect both record file and memo file structural corruption, locate and associate memos in the memo file to records in the record file and subsequently repair database files.

Drawing Reference Numerals

| 10. | Record File | 11. | Memo File |
|---|---|---|---|
| 12. | Record File Header | 13. | Record File Data Region |
| 14–19. | Fields | | |
| 21. | Memo File Data Region | 20. | Memo File Header |
| | | 22. | Record Code Indicator |
| 23. | Record Code Identifier | 24. | Memo Code Indicator |
| 26–29. | Offsets | R1–R4. | Records |
| RC1–RC4. | Record Codes | M1–M4. | Memos |
| MC1–MC4. | Memo Codes | P1–P4. | Memo Pointers |

DESCRIPTION OF THE PREFERRED EMBODIMENT

The description following illustrates the case when both record files and memo files are included in the database. The simpler case of a database containing record files only, should be apparent from this description.

Figure 1:
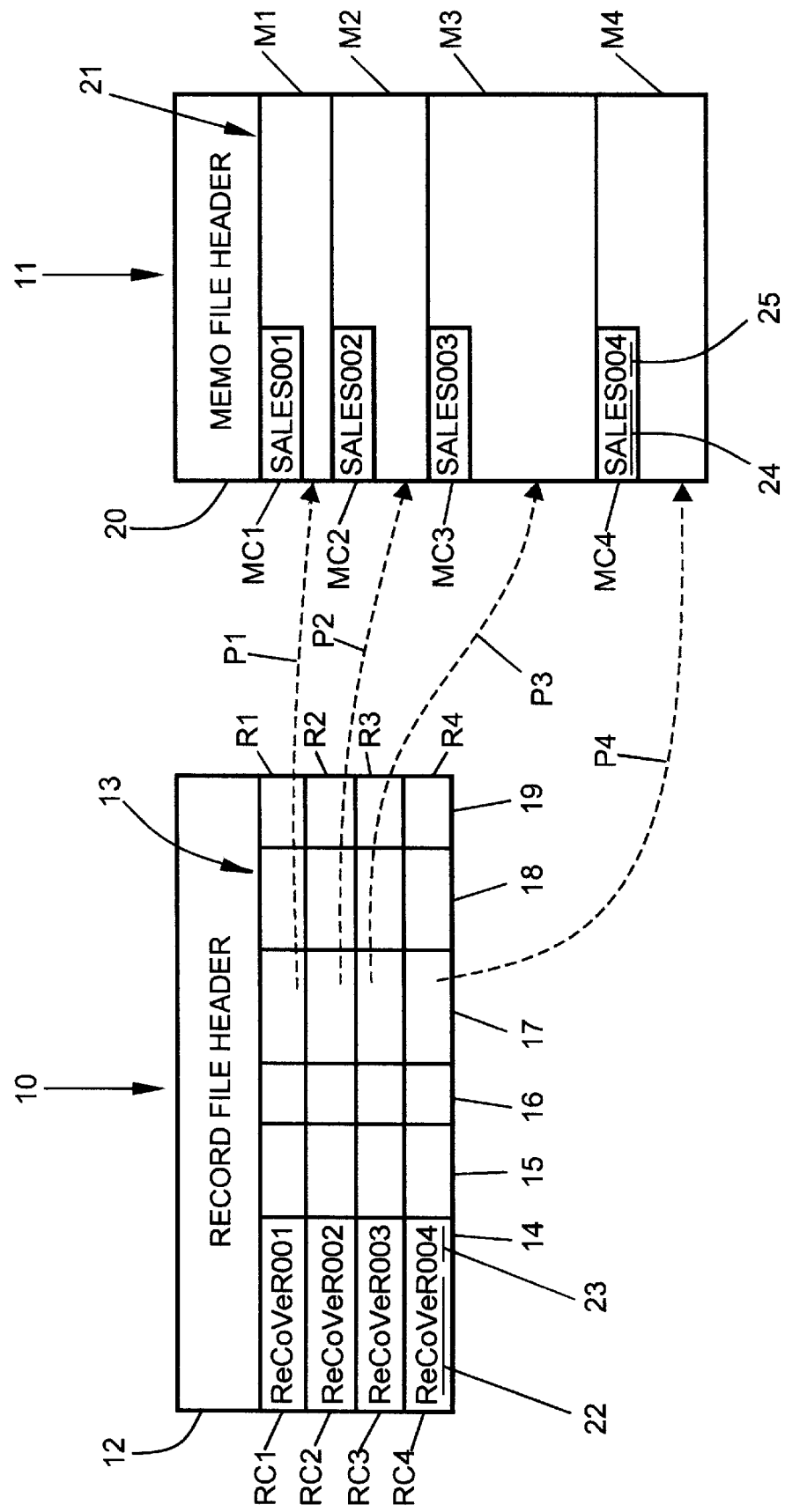
FIG. 1 shows database files embedded with record and memo codes in accordance with a preferred embodiment of the invention.

An exemplar intact database is comprised of a record file 10 and a memo file 11, as shown in FIG.1. Record file 10 includes a conventional file header 12 with file structure information (not shown), and a data region 13 that includes records R1 to R4 where useful information is stored. The records are located at fixed byte intervals, and are arranged in consecutive serial order according to the record file structure. Each record includes multiple fields 14–19 for storing categorized information formatted into fixed-length fields. Although only four records with six fields each are shown in the described example, record file 10 may include any number of records and fields. Records R1–R4 include respective record codes RC1–RC4 which are generated when the records are created. The record codes preferably occupy the first field 14 of each record, but they may occupy any other field if desired, and do not even have to be a field, but merely a code as part of the record structure. Memo file 11 includes a file header 19 and a data region 20 that includes memos M1–M4 where useful information is stored. Memos M1–M4 include respective memo codes MC1–MC4 which are generated when the memos are created. The memo codes preferably occupy the beginning of the memos, but they may be positioned elsewhere if desired. As shown in the example described, memos may be of variable length.

Each record code is comprised of a common record code indicator 22 and a unique identifier 23. In this example, code indicator 22 is "RECOVER", and identifiers 23 are sequentially generated numbers "001" to "004." Code indicator 22 may be user definable or automatically selected, and may be any other word, characters, or numbers. Identifiers 23 may be random numbers or characters. Each memo code is comprised of a memo code indicator 24, and the same identifier 23 of a corresponding record code. In this example, memo codes MC1–MC4 share the identifiers 24 of respective record codes RC1–RC4.

Fields 17 of records R1–R4 are pointer fields that include respective conventional pointers P1–P4 that point to corresponding memos M1–M4. In this example, the pointers are numbered to correspond with the numbers of the memos for the sake of simplicity, but in an actual database, the pointers usually point to memos in a random order, so that the pointer for the first record may point to the third memo, the pointer for the second record may point to the first memo, etc. Pointer fields are conventionally named with user definable names. The pointer field name is used for code indicator 24, which in this example is "SALES". Record file 10 and memo file 11 are generated by conventional methods well known in the art. Tables 1 and 2 are respective pseudo code listings for generating the record and memo codes. The pseudo codes are reducible to source codes in any desired computer language with conventional techniques. Each algorithm step is uniquely numbered. Comment lines are preceded by '//'.

TABLE 1

[Description caption for Table 1: Pseudo code listing for generating the record code indicator and record code identifier, when a new record is added to record file.]

| | |
|---|---|
| 101 | Generate code indicator |
| | // Use same code indicator for all record codes, |
| | // e.g., "RECOVER" |
| 102 | Generate record code identifier unique to each record |
| | // Identifiers may be random or sequential numbers, |
| | // characters, or a combination of both. |
| 103 | Append identifier to code indicator |
| 104 | Insert resulting record code in first field of new record |

TABLE 2

[Description caption for Table 2: Pseudo code listing for generating the memo code indicator and memo code identifier, when a new memo is added to memo file.]

| | |
|---|---|
| 201 | Get name of the pointer field in the current record and use it as the code indicator of the memo code |
| | // The code indicator for a memo code is the name of the |
| | // pointer field in a corresponding record, e.g. "SALES" |
| 202 | Copy identifier from record code of the same record and append it to the code indicator of the memo code |
| 203 | Insert resulting memo code at the beginning of the new memo |

Figure 2:
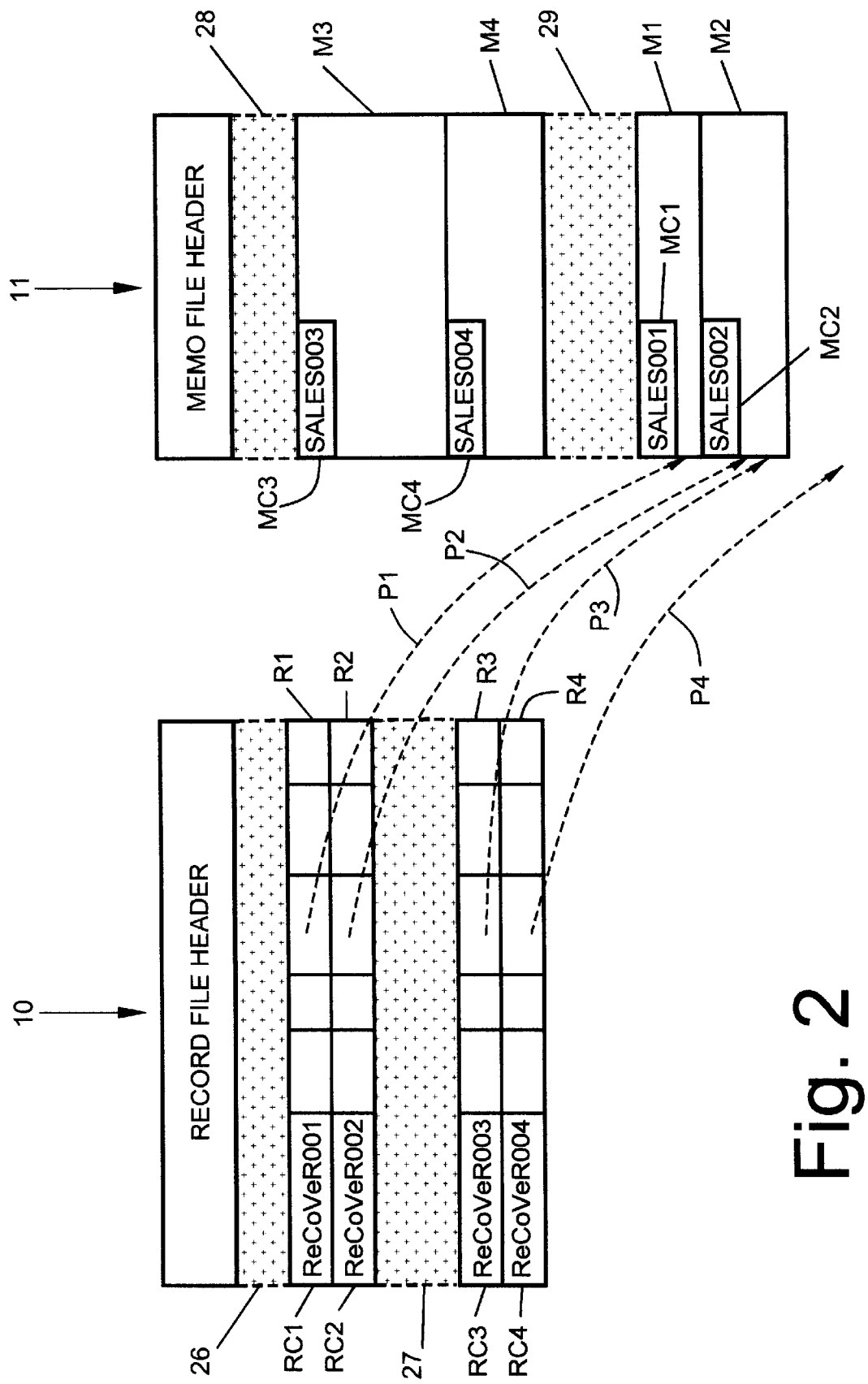
FIG. 2 shows the database files after it is corrupted.
Figure 3:
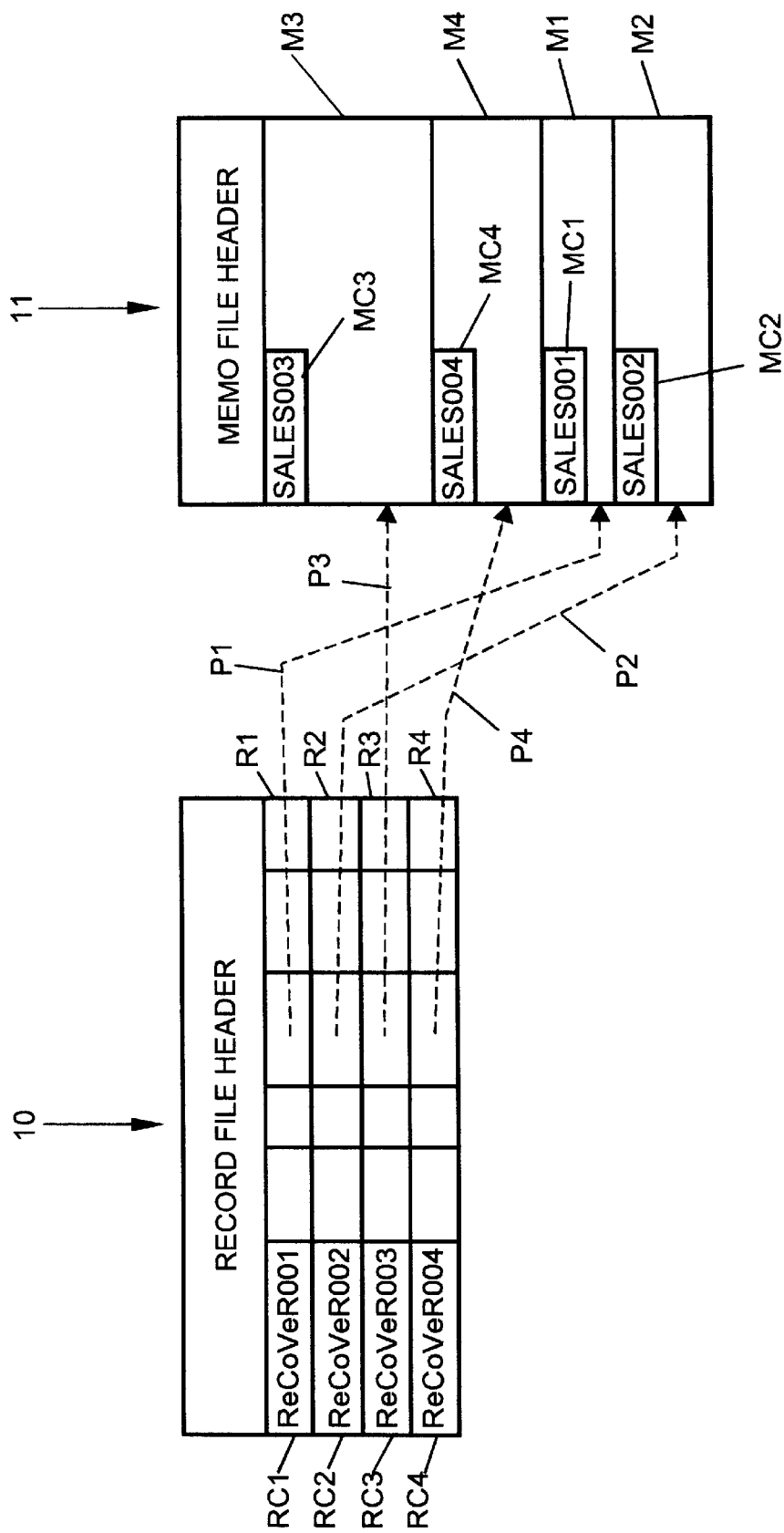
FIG. 3 shows the restored database files.

Record file 10 and memo file 11 are shown corrupted in FIG. 2. In this example, the corruption of file integrity includes improper offsets 26–29, memos M1–M4 which are arranged out of sequence, cross-linked pointers P2 and P3 pointing to the same memo, and illegal pointer P4 which is pointing beyond the memo file. Table 3 contains pseudo code listing of an algorithm for detection of errors within the record file, the memo file and the memo pointers. A pseudo code listing for the subsequent process needed to restore file integrity to the corrupted file, including both record files and memo files, is shown in Table 4. In both of these listings, the words 'error' and 'corruption' are used interchangeably, and indicate the same effect.

TABLE 3

[Description caption for Table 3: Pseudo code listing for error detection.]

| | |
|---|---|
| | // record file error detection |
| 300 | Check record file data region for corruption by verifying the location of record code indicators at all standard structural record positions. |
| 305 | IF an error found, set record file error flag. |
| | // memo file error detection |
| 310 | Check memo file data region for corruption by locating all memo code indicators and verifying that they are in correct structural positions. |
| 315 | If error exists, set memo file error flag. |
| | // Memo pointers error detection |
| 320 | DO for each non-zero memo pointer in record file |
| 321 | Get memo code from memo field name and corresponding record code identifier. |
| 322 | Check if the memo code can be found at correct structural position in memo file pointed to by the memo field pointer in the record. |
| 323 | If any error, set memo pointer corruption flag. |
| | END DO |

TABLE 4

[Description caption for Table 4: Pseudo code listing for correcting errors and restoring file integrity.]

| | |
|---|---|
| | // Repair record file data region if needed |
| 401 | IF record file data region corrupt |
| 402 | Search through record file for record code indicators. |
| 403 | Rewrite file to eliminate offsets and place records in correct structural positions. |
| | END IF |
| | // Repair memo file data region if needed |
| 420 | IF memo file data region corrupt |
| 421 | Locate all memos in memo file by searching for memo code indicators and save locations of memos in temporary computer memory. |
| 422 | Rewrite memo file to have located memos in correct structural positions |
| 423 | Set memo pointer corruption flag |
| | END IF |
| | // Record file memo pointers repair |
| 430 | IF memo pointers corrupt |
| 431 | DO for each memo field pointer in record file |
| 432 | Obtain memo code for correct memo from memo field name and record identifier code and check if the memo code is found at pointed to memo file position. |
| 433 | IF memo field pointer indicates an incorrect memo |
| | // E.g., if memo code in step 432 not found at memo file |
| | // memo position pointed to. |
| 434 | Search in memo file for memo having the memo code obtained in step 432 |
| 440 | IF correct memo found |
| 441 | Change memo field pointer to indicate correct memo position |
| | ELSE // Point to no memo |
| 442 | Set memo field pointer to 0 |
| | END IF |
| | END IF |
| | END DO |
| | END IF |

For both the record file 10 and the memo file 11, corruption or damage to file integrity is detected by verifying that record code indicators and memo code indicators are at structurally correct positions within their respective files; and by checking that memo pointers in records indicate positions of memos with correct memo code in the memo file.

When data integrity in the record file is damaged, the computer program of the present invention searches the entire damaged file for traces of the record code indicator, the first segment of the record code within every record which is a common inclusion for each record contained in the record file. The combination of the record code indicator in conjunction with the known record length then provides reliable information for recapturing the contents of the entire record. Similarly, when the contents of a memo file data region becomes corrupted, searching the entire file for memo code indicators, contained in the first segment of the memo code, provides locations of valid memo data in the memo file and provides means of restoring the memo file data region to structural integrity. When record file and memo file data regions are structurally restored, every memo pointer in the record file can be correctly re-associated with correct memo in the memo file by locating the corresponding memo code in the memo file.

The offsets of both files are thus eliminated, and their data regions are rewritten in their correct structural positions; the records are positioned at correct sequential record locations and the memos start properly at memo block intervals-for example, at conventional 512 byte intervals, if required. As shown in the drawings, the cross-linked pointer P3 and illegal pointer P4 are corrected, although after restoration, memos M1–M4 remain in the disrupted order caused by the corruption, i.e., arranged in the order: M3, M4, Ml, M2. As long as pointers P1–P4 are rewritten to point to the correct memo, the order of the memos is inconsequential.

The methods provided in Tables 1–4 are preferably incorporated in a database application program for automatically generating the record codes and memo codes when the database files are created, automatically checking for corruption, and automatically restoring the files, all without user intervention. Alternatively, corruption detection and restoration may be controlled by the program as independent processes, implemented as separate user selectable functions. The code generating and inserting functions may be incorporated into a compiler used for creating database application programs, so that application programmers are freed from having to create them. Any database application programs or any compiler that incorporates the devices and methods of the present invention may be preferably stored and distributed on a computer-readable storage medium, with the computer software program or compiler containing the necessary binary code required for specific system hardware and software not herein further defined or particularized with limitation. Accordingly, I have provided a method for encoding, corruption detection and restoration of database files. It detects, identifies and repairs record dislocations in the data region of record files. When memo files are present, the method detects memo dislocation errors and memo pointer corruption; repairs memo offsets; and identifies and resolves incorrect, illegal and cross-linked pointers. It is substantially automatic in its operation, so that no further user intervention or response is required.

The above descriptions are intended to be instances having illustrative value, and should not be considered as limitations on the scope of the invention. Many substitutes and variations are possible within the teachings of the invention. For example, the record and memo codes may contain binary or ASCII characters. Instead of the name of the pointer field, the code indicator of the memo codes may be the field number of the pointer field. The record code could include additional information about the original record sequence, or such information can be included in the code identifier. Furthermore, the methods for generating record and memo codes, error detection and checking and restoring the files may be varied. Conventional file header checking and restoring methods may be incorporated into the error detection and correction processes. Additional codes may be provided in a third file used by some database system for referencing the record and memo files. Some databases, like Microsoft Access with MDB file extensions, combine records, memos and other information in a single file. However, the records and memos are still inherently separate entities in the file so that record and memo encoding methods presented here could be used to identify and recover record and memo data reliably.

Therefore, the scope of the invention should be determined and limited only by the following appended claims and their legal equivalents.

I claim:

1. A method of encoding computerized database files for improved detection of file damage and recovery of data from the damaged files, said database files consisting of a record file and an optional memo file comprising a number of memos, said record file comprising a number of uniquely identified records having one or more record fields, where each record field furthermore may be optionally associated with information contained in said memo file, the associated record field having a memo pointer referencing a specific memo in said memo file, the said method comprising the steps of:

(a) generating a unique record code in each record; and when said memos are present, (b) generating a unique memo code in each memo for identifying the association of the memo to one particular record field and one uniquely identified record.

2. The method of claim 1 wherein said record code is arranged in one of said fields of each of said records.

3. The method of claim 1 wherein said memo code is arranged at a beginning of each of said memo.

4. The method of claim 1 wherein the record code is identical to all records when said memos are not present.

5. The method of claim 1 wherein said records and said memos are arranged within a single database file, said record file and said memo file thus referring to the same said database file.

6. The method of claim 1 wherein each record code comprises a record indicator combined together with a record identifier, where the record indicator is identical for all records and where the record identifier uniquely identifies each record; and when memos are present, wherein each memo code comprises a memo indicator combined together with a memo identifier, where the memo identifier is identical to the record identifier of the record associated with the memo, and where the memo code indicator is identical for identical record fields across different records, and furthermore where the memo code indicator is unique for any one record field within any one record.

7. The method of claim 6 wherein the memo code indicator comprises a name.

8. The method of claim 6 wherein said record code identifier is furthermore used for identifying the original sequence of said records.

9. The method of claim 6 wherein said records and said memos are arranged within a single database file, said record file and said memo file thus referring to the same said database file.

10. An improved method for detecting corruption in the file integrity of uniquely encoded database files in a computer system, said database files consisting of a record file and an optional memo file comprising a number of memos, said record file comprising a number of uniquely identified records having one or more record fields, where each record field furthermore may be optionally associated with information contained in said memo file, the associated record field having a memo pointer referencing a specific memo in said memo file, each said record having a unique record code, each said memo having a unique memo code for identifying the association of said memo to one particular record field and to one uniquely identified record when memos are present, the method comprising the steps of:

a) locating said record codes in record file and checking if said record codes are in correct positions in said record file, and if said memos are present, comprising further the steps of:

b) locating said memo codes in said memo file and checking if said memo codes are in correct positions in said memo file, and c) locating said memo pointers in said record file and checking if said memo pointers reference memos having correct memo code.

11. The method of claim 10 wherein the record code is identical all records when said memos are not present.

12. The method of claim 10 wherein said records and said memos are arranged within a single database file, said record file and said memo file thus referring to the same said database file.

13. An improved method for restoring the file integrity of uniquely encoded database files in a computer system, after said database files become corrupted, said database files consisting of a record file and an optional memo file comprising a number of memos, said record file comprising a number of uniquely identified records having one or more record fields, where each record field furthermore may be optionally associated with information contained in said memo file, the associated record field having a memo pointer referencing a specific memo in said memo file, each said record having a unique record code, each said memo having a unique memo code for identifying the association of said memo to one particular record field and to one uniquely identified record when memos are present, said method comprising the steps of:

(a) rewriting said record file to arrange said records having said record codes in desired structural positions when said record file is corrupt, and when said memos are present, comprising further the steps of:

(b) rewriting said memo file to arrange said memos having said memo codes in desired structural positions when said memo file is corrupt, and (c) for each said memo pointer in said record referencing a memo with incorrect memo code, searching in said memo file for the matching memo code corresponding to said record code of said record and rewriting said pointer to point to a corresponding memo when said matching memo code is found.

14. The method of claim 13 wherein the record code is identical all records when said memos are not present.

15. The method of claim 13, comprising the further step of rewriting said memo pointer to point to no memo when no memo having a corresponding memo code is found.

16. The method of claim 13 wherein said records and said memos are arranged within a single database file, said record file and said memo file thus referring to the same said database file.

\* \* \* \* \*